(12) United States Patent
Gill

(10) Patent No.: US 8,925,903 B2
(45) Date of Patent: *Jan. 6, 2015

(54) SAFETY BARRICADE SYSTEM

(75) Inventor: Shane Gill, Yorktown (AU)

(73) Assignee: Bart's Ltd, Harbour City (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/116,401

(22) PCT Filed: Sep. 9, 2011

(86) PCT No.: PCT/AU2011/001165
§ 371 (c)(1),
(2), (4) Date: Jan. 17, 2014

(87) PCT Pub. No.: WO2012/142645
PCT Pub. Date: Oct. 26, 2012

(65) Prior Publication Data
US 2014/0124723 A1    May 8, 2014

Related U.S. Application Data

(63) Continuation of application No. 13/197,565, filed on Aug. 3, 2011, now Pat. No. 8,636,266.

(30) Foreign Application Priority Data

May 9, 2011 (AU) ................................ 2011100520

(51) Int. Cl.
| | |
|---|---|
| *E04H 17/16* | (2006.01) |
| *E04H 17/04* | (2006.01) |
| *E04G 21/32* | (2006.01) |
| *E04G 5/14* | (2006.01) |
| *E04F 11/18* | (2006.01) |

(52) U.S. Cl.
CPC .......... *E04H 17/04* (2013.01); *E04G 2005/148* (2013.01); *E04F 2011/1831* (2013.01); *E04F 2011/1823* (2013.01); *E04G 21/3223* (2013.01); *E04F 11/1855* (2013.01); *Y10S 256/06* (2013.01)
USPC ........................... 256/24; 256/DIG. 6; 24/458

(58) Field of Classification Search
USPC ........ 256/24, 27, 73, 65.14, DIG. 6; 160/135; 182/138, 82; 52/454, 664, 63; 24/455, 24/457, 458, 460
See application file for complete search history.

(56) References Cited

U.S. PATENT DOCUMENTS

| | | |
|---|---|---|
| 3,480,069 A | 11/1969 | Handwerker |
| 3,962,827 A | 6/1976 | Chaffee |

(Continued)

FOREIGN PATENT DOCUMENTS

| | | |
|---|---|---|
| AU | 2010202985 | 8/2010 |
| EP | 1607551 A1 | 12/2005 |
| EP | 1936072 A1 | 6/2008 |

OTHER PUBLICATIONS

International Search Report for PCT/AU2011/001165, dated Jun. 12, 2011, 3 pgs.

*Primary Examiner* — Daniel P Stodola
*Assistant Examiner* — Jonathan Masinick
(74) *Attorney, Agent, or Firm* — Woodard, Emhardt, Moriarty, McNett & Henry LLP

(57) ABSTRACT

A barricade system (100) comprising at least one clip (102) having a first engagement formation (104A, 105A) adapted to secure the clip (102) to a fixed structure, the clip further having a second engagement formation (104C, 105G). The system (100) includes a joiner element (106) having a third engagement formation (106A) located on a first side, and a fourth engagement formation (106B) located on an opposing second side, the third engagement formation (106A) being adapted to engage the second engagement formation (104C, 105G) to secure the joiner element (106) to the clip (102). The system (100) includes at least one mesh panel (101) and a stopper element (107) having a fifth engagement formation (107A). The fifth engagement formation (107A) is engageable with the fourth engagement formation (106B) to secure the stopper element (107) to the joiner element (106) with a portion of the mesh panel (101) located therebetween.

20 Claims, 8 Drawing Sheets

(56) References Cited

U.S. PATENT DOCUMENTS

| | | |
|---|---|---|
| 4,129,197 A | 12/1978 | Preston |
| 4,805,735 A | 2/1989 | Anderson |
| 4,838,382 A | 6/1989 | Nusbaum |
| 4,858,724 A | 8/1989 | St-Germain |
| 4,928,929 A | 5/1990 | Kinder |
| 5,182,889 A | 2/1993 | Johnson |
| D356,380 S | 3/1995 | Reinklou |
| D356,644 S | 3/1995 | Henderson |
| 5,487,690 A | 1/1996 | Stoffle et al. |
| 5,556,080 A | 9/1996 | Vise |
| 5,787,955 A | 8/1998 | Dargie |
| 6,283,456 B1 | 9/2001 | Benz et al. |
| 6,367,216 B1 | 4/2002 | Maylon |
| 6,371,419 B1 | 4/2002 | Ohnuki |
| 6,406,003 B1 | 6/2002 | Shaw |
| 6,824,122 B2 | 11/2004 | Spyrakis |
| 6,932,194 B1 | 8/2005 | Chipman |
| 7,730,677 B2 | 6/2010 | Hansen |
| 7,866,635 B2 | 1/2011 | Payne |
| 2006/0151770 A1 | 7/2006 | Payne |
| 2006/0180390 A1 | 8/2006 | Thaler |
| 2006/0186391 A1 | 8/2006 | Hansen |

SAFETY BARRICADE SYSTEM

FIELD OF THE INVENTION

The present invention relates to a safety barricade system, more specifically, a safety barricade system that is installed around the perimeter of a building or structure and used during or after construction in order to prevent objects from falling from the building or structure.

Scaffolding is required in many construction scenarios. Scaffolding significantly reduces the risk of workers falling from height. However, scaffolding usually consists of interconnected horizontal and vertical rails, and there is still significant spacing between the scaffold rails. Accordingly, there are many instances where tools or building materials fall to a lower level or the ground, which endangers works on the site.

Shade cloth is used on some construction sites to reduce direct sunlight, and reduce the likelihood of objects falling or being blown from the site by high winds. A disadvantage with existing shade cloth is that it is often time consuming to install, and may not be sufficiently strong to withstand forces generated by some falling objects.

Another problem with existing shade cloth and other temporary construction screening is that they can be difficult and/or time consuming to install on non linear, curved surfaces, or areas and surfaces having abnormal geometry.

DISCUSSION OF THE PRIOR ART

The Thaler Patent Application Publication (U.S. Pub. No. 24 2006/0180390) discloses a roof fall protection apparatus that comprises several components that can be easily assembled and disassembled on site and that are adaptable to various building geometries. However, the apparatus requires at least two support members in order to assemble the apparatus thereon, and does not rely upon existing structures.

The Preston patent (U.S. Pat. No. 4,129,197) discloses a safety-catch scaffolding system adaptable to the progressive growth of a building during construction having a series of spaced uprights, each having a plurality of vertically disposed slots for the sliding engagement of the edges of a plurality of frames.

The Handwerker patent (U.S. Pat. No. 3,480,069) discloses a temporary wall construction for a building site. However, the wall requires grommets to secure a panel to an exterior surface of a building, and is not adaptive to secure a mesh panel to other objects.

The Nusbaum patent (U.S. Pat. No. 4,838,382) discloses a safety net that is raised during construction of a multi-floor building without the use of tracks vertically attached to the outer building face. The safety net extends from a surface of a building away therefrom.

The Johnson patent (U.S. Pat. No. 5,182,889) discloses a barrier system that is lightweight and exceeds existing safety regulations. The barrier system employs the use of a plurality of rod-like, elongated bodies to support the mesh.

OBJECT OF THE INVENTION

It is an object of the present invention to substantially overcome or at least ameliorate one or more of the above disadvantages, or to provide a useful alternative.

SUMMARY OF THE INVENTION

In a first aspect, the present invention provides a barricade system comprising:
   at least one dip having a first engagement formation adapted to secure the clip to a fixed structure, the clip further having a second engagement formation;
   a joiner element having a third engagement formation located on a first side, and a fourth engagement formation located on an opposing second, the third engagement formation being adapted to engage the second engagement formation to secure the joiner element to the clip;
   at least one mesh panel; and
   a stopper element having a fifth engagement formation;
   wherein the fifth engagement formation is engageable with the fourth engagement formation to secure the stopper element to the joiner element with a portion of the mesh panel located therebetween.

The third engagement formation is preferably eccentric relative to the fourth engagement formation.

The second engagement formation preferably includes a first aperture, and the third engagement formation includes a first projection having a flange adapted to engage with the first aperture.

The fourth engagement formation preferably includes a second projection, having a flange adapted to engage with a stopper element aperture formed in the stopper element.

The first projection and the second projection are preferably generally parallel and offset relative to each other.

The first engagement formation preferably includes one or more channels including angled teeth;
   wherein the angled teeth are directed toward a base region of the channel, and presented at an angle such that upon insertion of an object therein, the angled teeth inhibit removal of said object from the channel.

The second engagement formation preferably includes a plurality of said first apertures permitting the first projection to be mounted in multiple locations.

The first engagement formation preferably includes a clevis shaped body having two arms that extend away from one another; further wherein the two arms define a generally cylindrical opening adapted to receive a cylindrical object.

Both of the arms preferably include a pin hole that enables the insertion of a pin to enclose the cylindrical opening.

The clip preferably includes a notch that is located at the base of and in between the two arms;
   wherein the notch enables the insertion of a removal tool between the clevis shaped body and the cylindrical object.

The stopper element is preferably a generally circular disc and the stopper element aperture is located in a central region of the disc.

The barricade system further preferably comprising a joiner assembly to secure adjacent sections of said mesh panel to one another.

The joiner assembly preferably includes a body having a first longitudinally extending joiner channel and a second longitudinally extending joiner channel, the first and second longitudinally extending joiner channels each being adapted to receive an edge portion of said mesh panel.

The barricade system preferably further includes angled teeth located in the first and second longitudinally extending joiner channels;
   wherein the angled teeth are directed toward a base of the first and second longitudinally extending joiner channels, and presented at an angle such that upon insertion of a mesh panel therein, the angled teeth inhibit removal of said mesh panel.

The joiner channels are preferably coplanar to interconnect coplanar edges of adjacent mesh panels.

The joiner channels are preferably angularly inclined relative to each other.

The joiner element preferably has a generally oval shaped body.

The second engagement formation is preferably pivotally engaged with the third engagement formation.

In a second aspect, the present invention provides a method of installing a barricade system to a fixed structure, the method including the steps of:

engaging a first engagement formation formed on a dip to the fixed structure;

engaging a second engagement formation formed on the clip to a third engagement formation formed on a joiner element;

placing a mesh panel adjacent to the joiner element;

rotating a body portion of the joiner element so that a fourth engagement formation formed on an opposing side of the joiner element relative to the third engagement formation becomes aligned with an aperture formed in the mesh panel; and securing a fifth engagement formation located on a stopper element to the fourth engagement formation to sandwich a portion of the mesh panel between the joiner element and the stopper element.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENT

Figure 1:
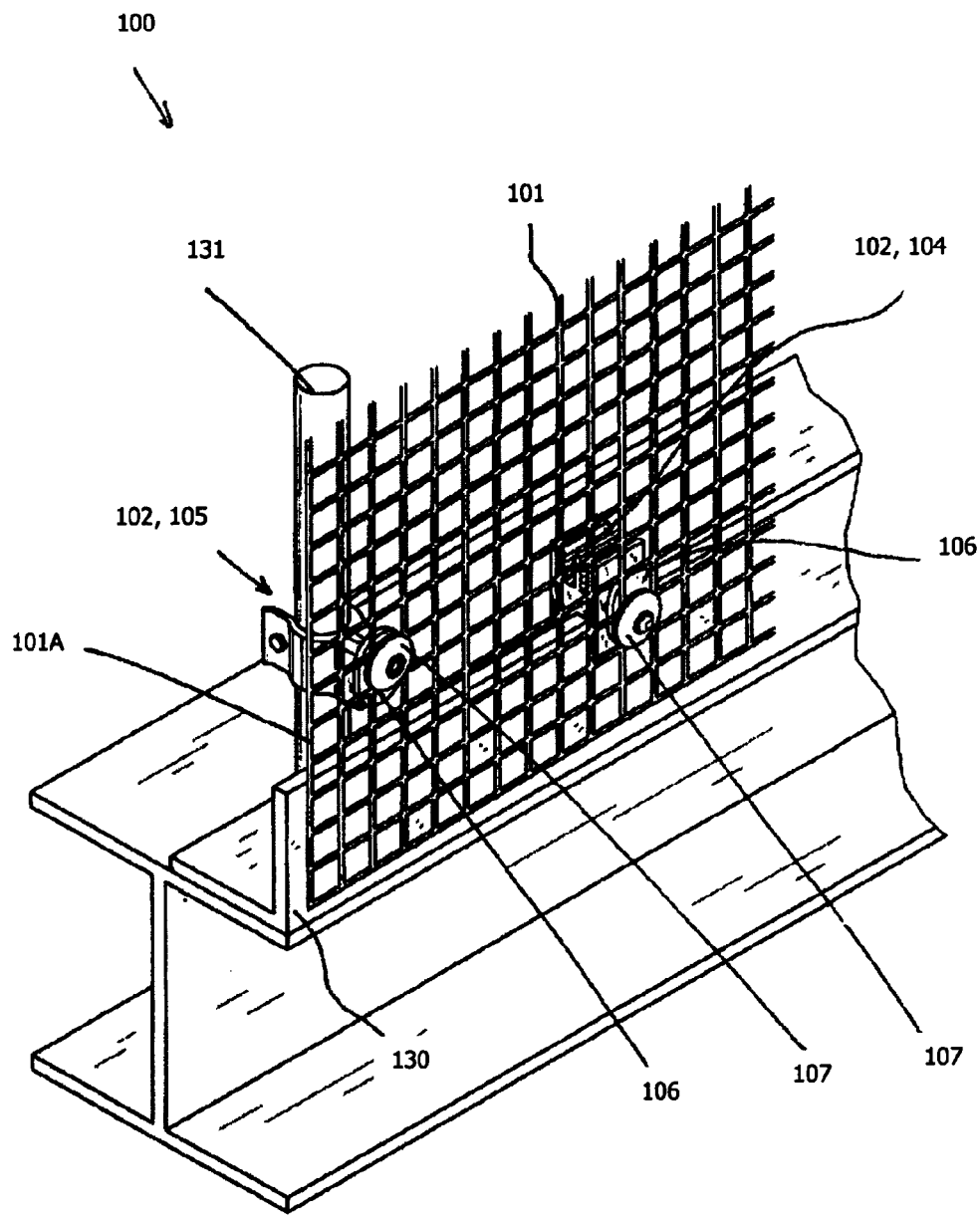
FIG. 1 illustrates a perspective view of the safety barricade system in which a mesh panel secured to an existing stanchion and handrail via two uniquely defined clips.

Detailed reference will now be made to the preferred embodiment of the present invention, examples of which are illustrated in FIGS. 1-10. A safety barricade system 100 includes at least one mesh panel 101 and a plurality of clips 102. The clips 102 secure the panel 101 to a support structure such as a scaffold post or the flange of a scaffold kick plate.

As depicted in FIGS. 2 and 5 to 7, the barricade system 100 may include a joiner assembly 103, to enable the abutting of adjacent sections of the mesh panel 101.

The mesh panel 101 may be manufactured in a variety of sizes. In the embodiment shown in the drawings, the mesh panel 101 includes a grid matrix pattern therein, which prevents objects larger than the spacing of the matrix from falling off of an elevated surface or structure when installed. The mesh panel 101 is light weight, approximately 2.6 Kg per metre attached. The mesh panel 101 is manufactured in modular plastic components consisting of, Geloy HRA222F/HRA170D and PVCU.

Figure 3:
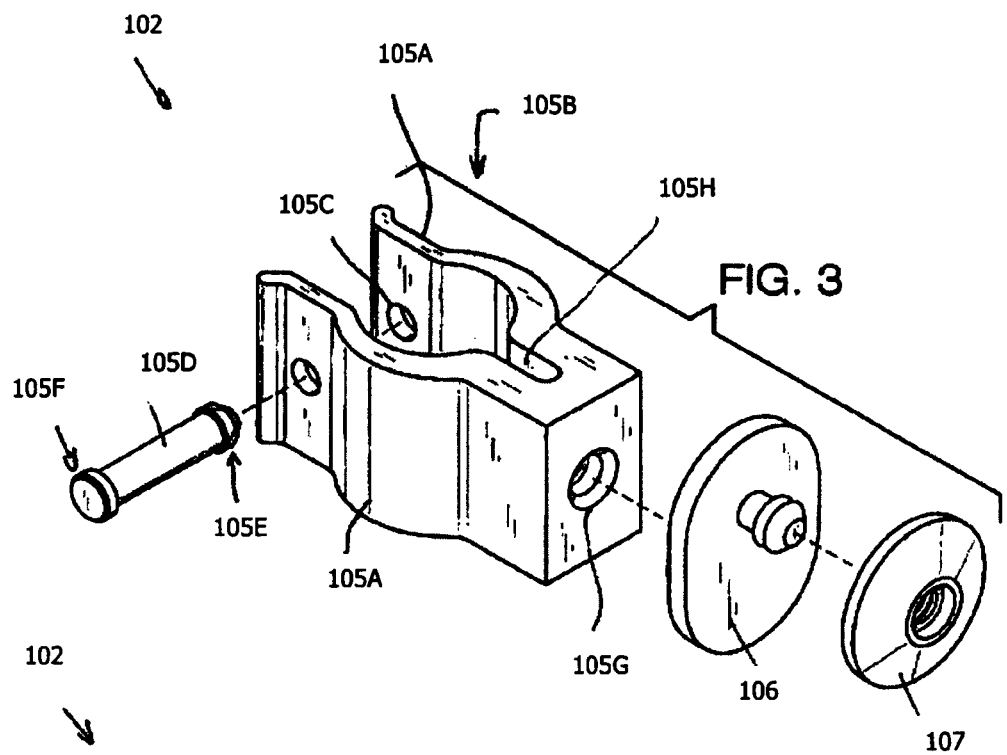
FIG. 3 illustrates a perspective view of a uniquely defined clip that includes the eccentric pin joiner and mesh clip button exploded therefrom as well as a locking pin, and which is ideally used with objects having circular cross-sections.
Figure 4:
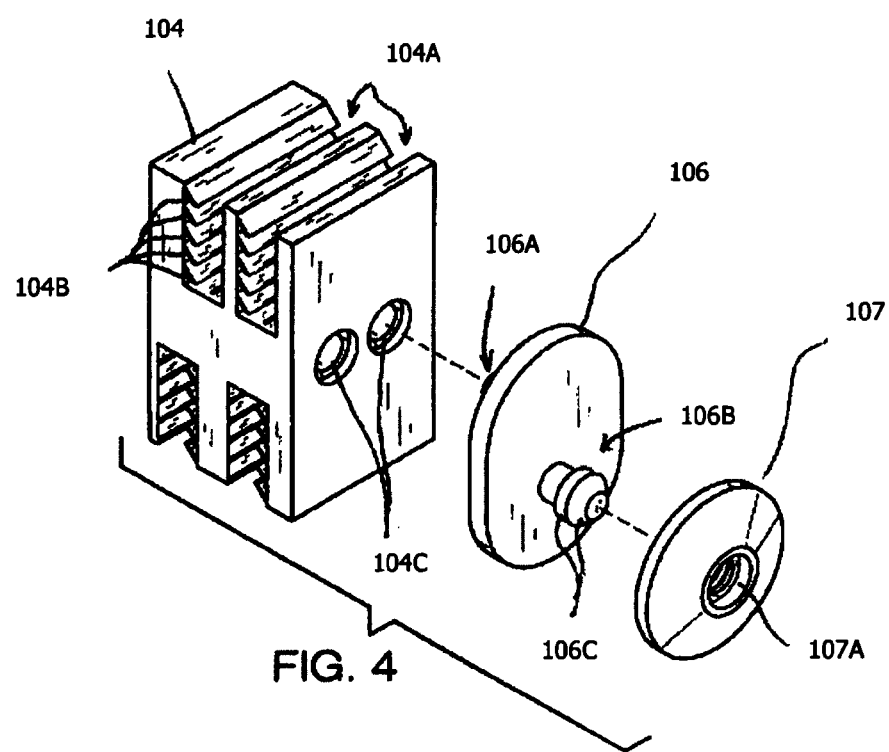
FIG. 4 illustrates a perspective view of another uniquely defined clip that includes a plurality of cavities thereon and which can engage either the mesh panel directly or an elongated surface.

The clips 102 are provided in two different mounting configurations. A tubular clip 105 as depicted in FIG. 3 is used to secure the mesh panel 101 to a tubular element such as a scaffold rail or post. In contrast, a kick rail dip 104 is depicted in FIG. 4 and used for securing a mesh panel 101 to a flange or other edge such as a kick rail. By using a combination of tubular clips 105 and rail dips 104, the mesh panel 101 can be secured to a wide range of fixed structural elements on a construction site.

Referring to FIG. 4, the kick rail clip 104 includes a first engagement formation in the form of a plurality of cavities or slots 104A that are generally parallel with one another. The slots 104A each include angled teeth 104B therein. The angled teeth 104B are presented at an angle such that upon insertion of a panel or board-like object 130 therein, the angled teeth 104B will engage said object therein, and inhibit removal of the object from the respective slot 104A.

As shown in FIG. 1, the kick rail clip 104 is ideally used to grip onto a rail or other such object 130, such as a kick plate, but may be secured to any other plate like structure.

The kick rail clip 104 includes one or more second engagement formations defined by holes 104C, which are located to enable attachment of an eccentric pin joiner 106 thereon. The eccentric pin joiner 106 includes a third engagement formation defined by a first projection 106A that extends perpendicularly with respect to the body of the eccentric pin joiner 106.

The eccentric pin joiner 106 also includes a fourth engagement formation defined by a second projection 106B, which extends perpendicularly with respect to the body of the eccentric pin joiner 106, and more particularly, the second projection 106B extends in an opposing direction with respect to the first projection 106A. The first projection 106A is generally parallel with respect to the second projection 106B. The first projection 106A is offset with respect to the second projection 106B, such that the first projection 106A is not aligned with the second projection 106B. The orientations of the two projections 106A and 106B is depicted in the cross sectional view of FIG. 9. The body of the eccentric pin joiner 106 has generally oval shaped profile.

By rotating the eccentric pin joiner 106 about the first projection 106A, the second projection 106B translates around a circle, which is generally coplanar with the mesh panel 101.

Both the first projection 106A and the second projection 106B each include a circumferentially extending flange 106C for securement with the holes 104C of the kick rail clip 104 or with a stopper element, depicted in the form of a mesh clip button 107. The flanges 106C are defined by one or more frustoconic portions, or a flared, barbed head located at or near the end of the projections 106A, 106B. The flanges 106C enable the two parts to snap together, but inhibit subsequent separation of the two parts.

The mesh clip button 107 is a generally circular disc having a fifth engagement formation defined by a centrally formed hole 107A, which is used to attach the mesh clip button 107 onto either the first projection 106A or the second projection 106B of the eccentric pin joiner 106.

The mesh dip button 107 and the eccentric pin joiner 106 are used to sandwich and secure a portion of a mesh panel 101 there between, and to attach to the clip 102.

Referring to FIG. 3, the tubular clip 105 is designed to secure the mesh panel 101 against a tubular surface 131, such as a handrail (see FIGS. 1 and 8-10). The tubular clip 105 has a generally clevis shaped body including a first engagement formation, depicted here as two arms 105A. The two arms 105A mirror one another, and form an opening 105B into which a tubular surface 131 such as a handrail is inserted when in use. It shall be noted that the tubular clip 105 and the cylindrical opening 105B may be scaled up or down to accommodate differently sized tubular surfaces 131.

Both of the arms 105A include a hole 105C that enables a pin 105D to be inserted there between and enclose the tubular surface 131 therein. The pin 105D includes circular flanges 105E that are analogous to the circular flanges 106C of the first projection 106A and the second projection 106B of the eccentric pin joiner 106. The pin 105D includes a shoulder 105F, which works with the circular flanges 105E to secure the pin 105D to the two arms 105A.

The tubular clip 105 also includes a second engagement formation, depicted here as a hole 105G, which works in the same manner as the hole 104C of the kick rail clip 104 in order to secure the eccentric pin joiner 106 thereon.

Figure 2:
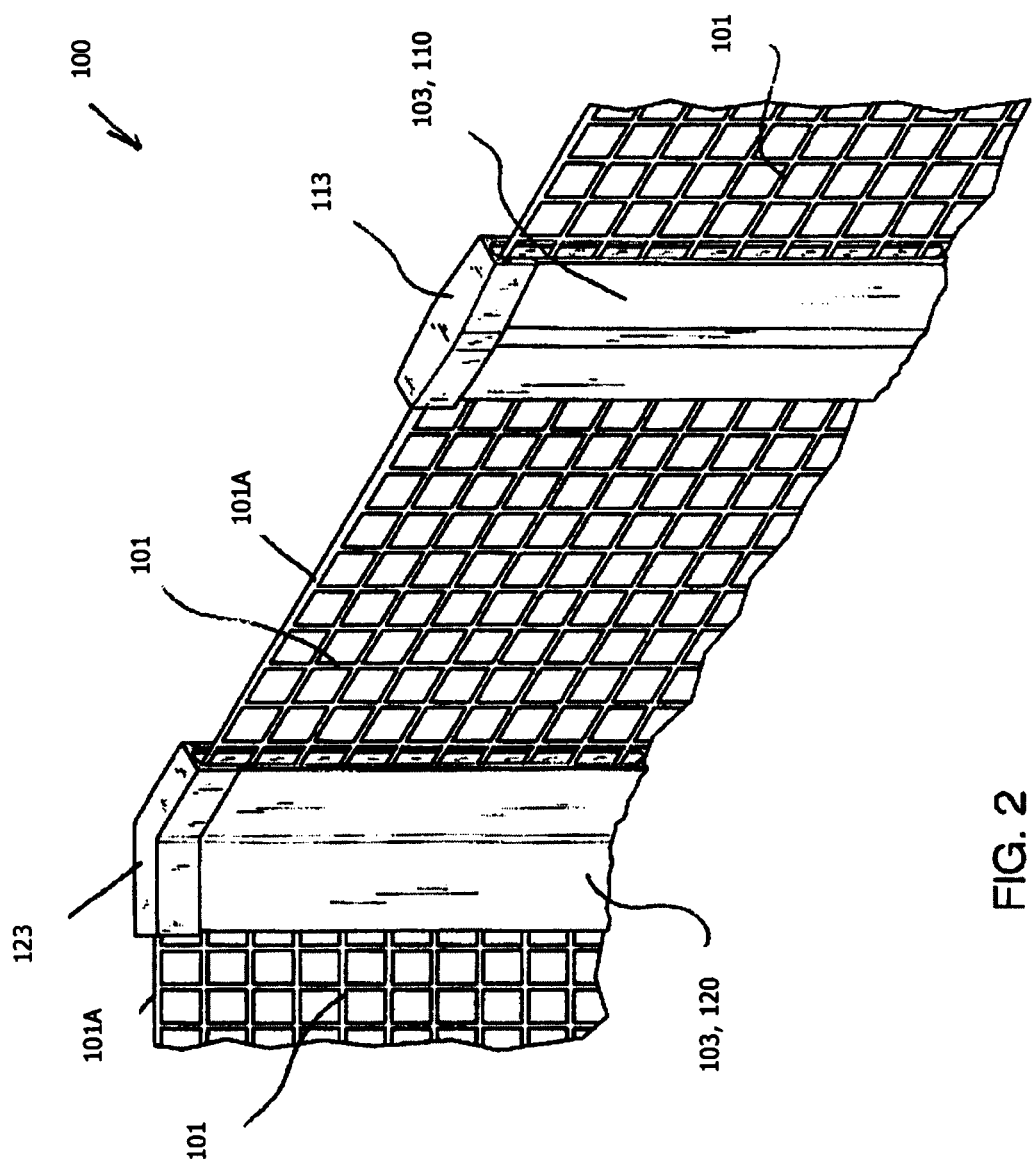
FIG. 2 illustrates a perspective view of multiple adjacent sections of mesh panels that are secured to one another via different joiner assemblies.
Figure 5:
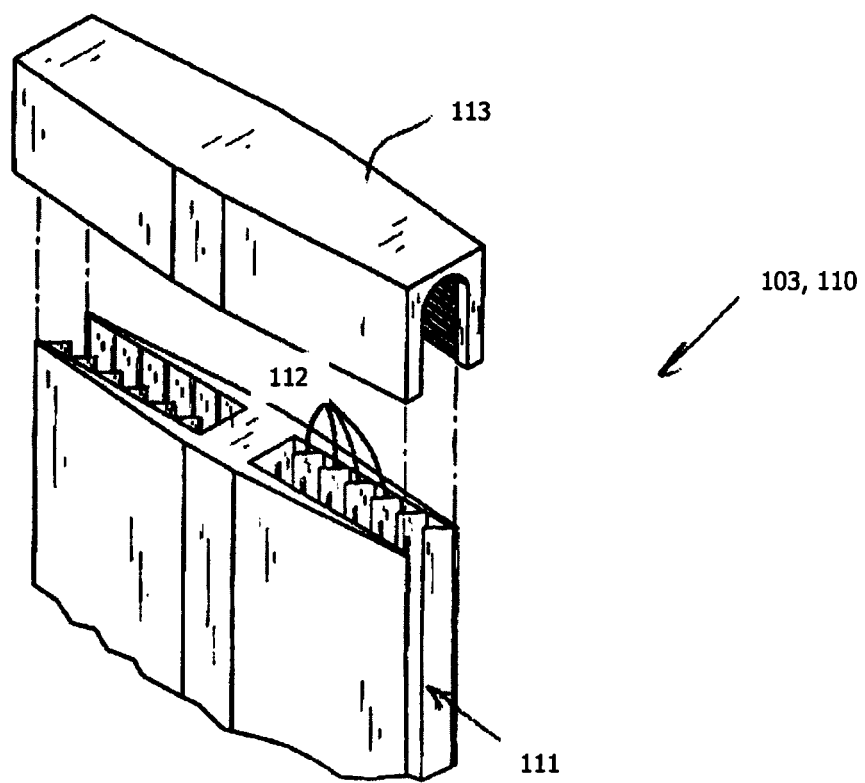
FIG. 5 illustrates a perspective view of a joiner assembly in which a cap is exploded therefrom and in which is ideally suited for securing adjacent mesh panels at a 180-degree orientation.

As described earlier, the barricade system 100 may include joiner assemblies 103 to secure adjacent sections of the mesh panels 101 together. Referring to FIGS. 2 and 5, a vertical joiner assembly 110 includes two cavities or channels 111 that extend in generally opposing directions relative to one another. The vertical joiner assembly 110 is of an undefined length, and in which the two cavities 111 span said undefined length. The cavities 111 include angled teeth 112 therein, which are oriented at an angle in order to grab and secure an edge 101A of the mesh panel 101 therein. The teeth 112 work in a manner consistent with the angled teeth 104B of the kick rail clip 104 described above. The vertical joiner assembly 110 includes a cap 113 that clips onto an end of the vertical joiner assembly 110 so as to enclose the side profiled openings of the cavities 111.

Figures 6, 7:
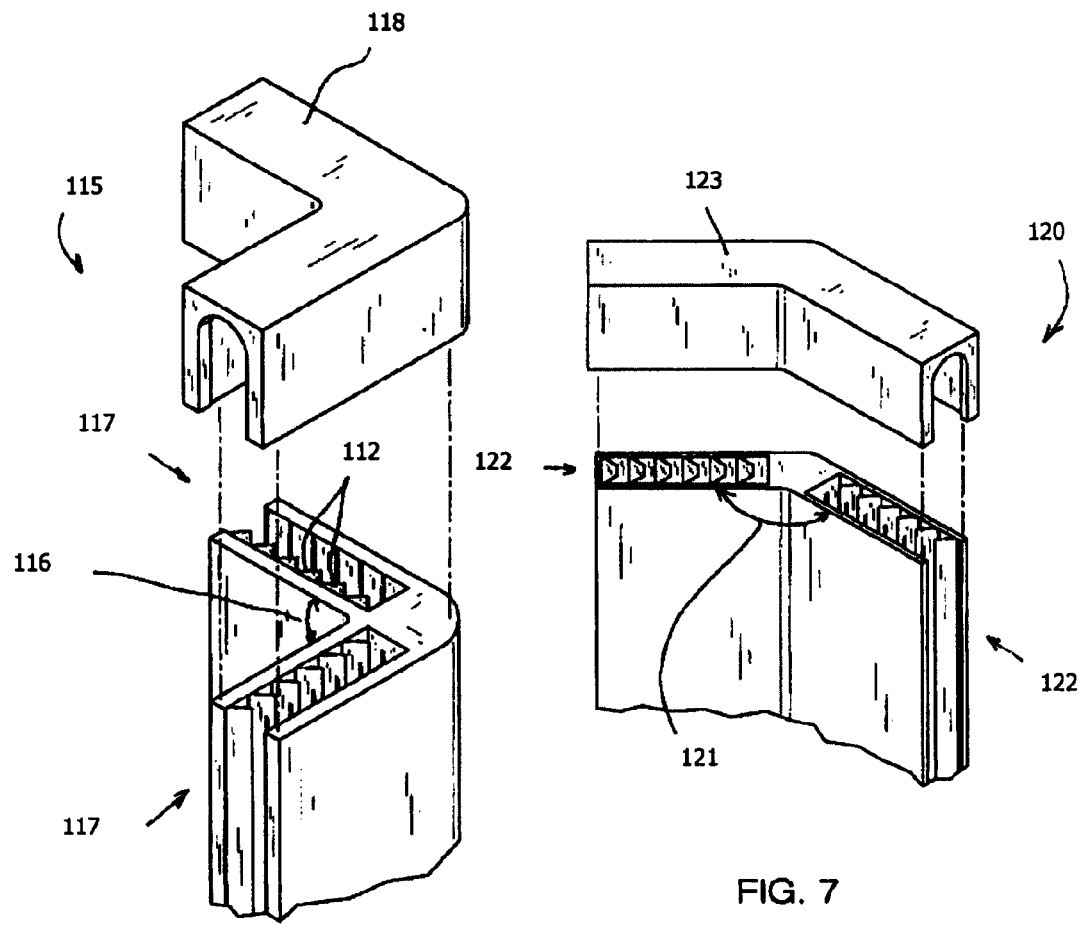
FIG. 6 illustrates a perspective view of a joiner assembly in which a cap is exploded therefrom and in which is ideally suited for securing adjacent mesh panels at a 90-degree orientation.
FIG. 7 illustrates a perspective view of a joiner assembly in which is cap is exploded therefrom and in which is ideally suited for securing adjacent mesh panels at an obtuse angular orientation.

Referring to FIG. 6, the invention 100 may employ the use of a corner joiner assembly 115, which is of an undefined length and features a 90-degree angle 116 that is formed between two cavities 117. The cavities 117 feature the angled teeth 112 described above in regards to the vertical joiner assembly 110. The corner joiner assembly 115 includes a cap 118, which works in the same manner as the cap 113 described above.

Referring to FIG. 7, the invention 100 may employ the use of an obtuse joiner assembly 120, which is of an undefined length and features an obtuse angle 121 that is formed between two cavities 122. The cavities 122 feature the angled teeth 112 described above in regards to the vertical joiner assembly 110. The obtuse joiner assembly 120 includes a cap 123, which works in the same manner as the cap 113 described above.

The joiner assemblies 103 (the vertical joiner assembly 110, the corner joiner assembly 115, and the obtuse joiner assembly 120) all provide the same function which is to secure adjacent sections of the mesh panels 101 together, but differ with respect to one another in the angles formed between the respective cavities. It will be appreciated that the joiner assembly 103 may be made to accommodate other angles, including an acute angle less than 90 degrees.

Figure 8:
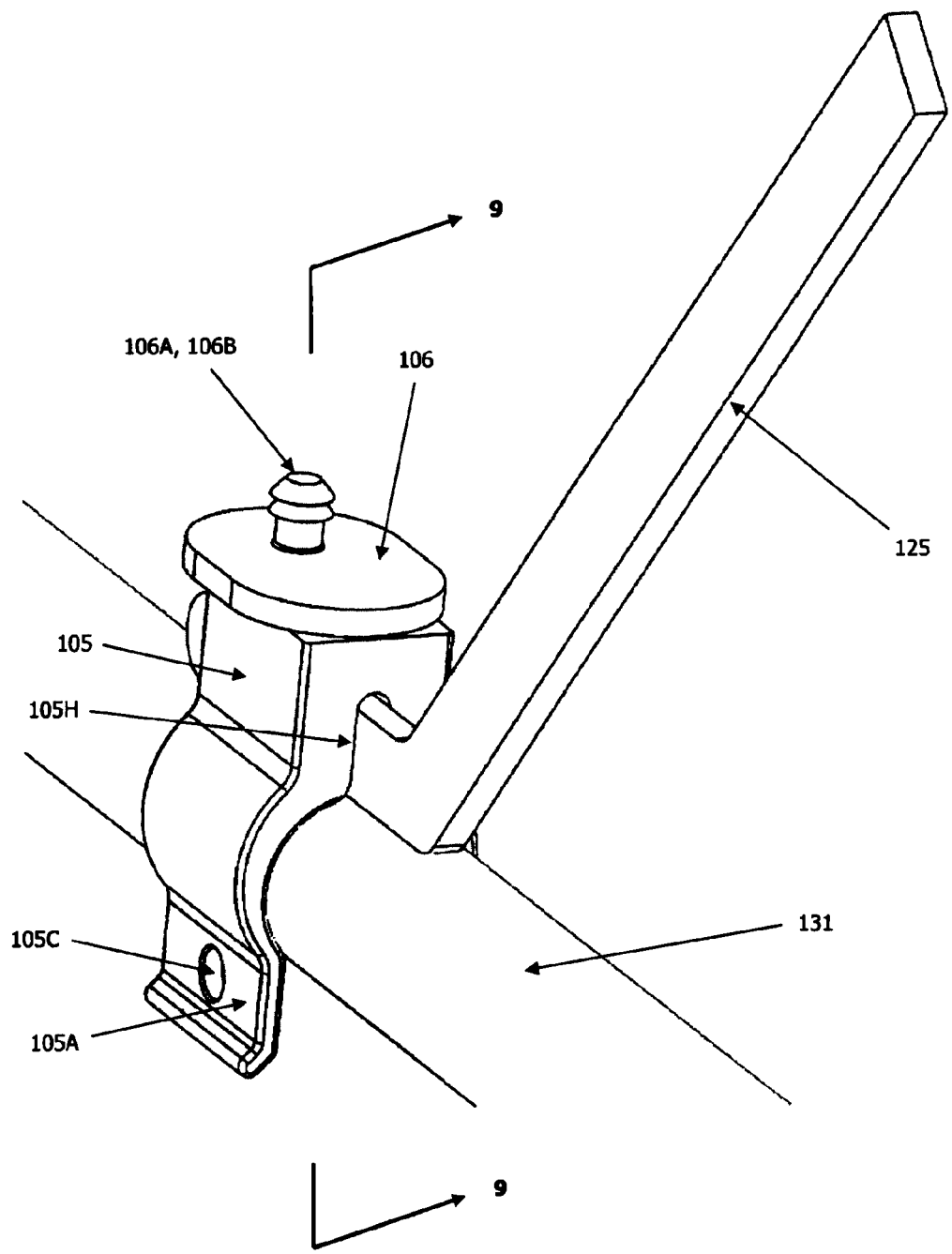
FIG. 8 illustrates a perspective view of the uniquely defined clip depicted in FIG. 3, and in which a removal tool is inserted therein.
Figure 9:
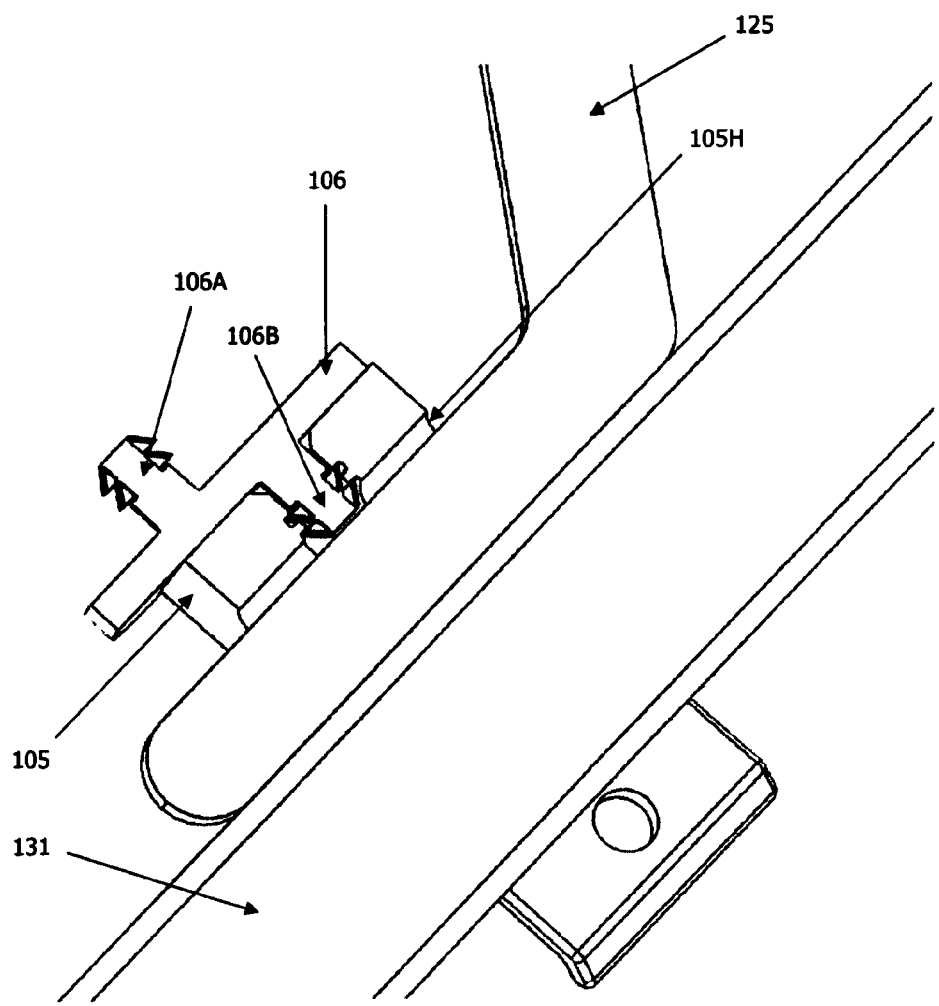
FIG. 9 illustrates a perspective view of the uniquely defined clip along line 9-9 in FIG. 8, and providing a rotational arrow indicating rotation of the removal tool thereby disengaging the respective clip from the tubular surface.
Figure 10:
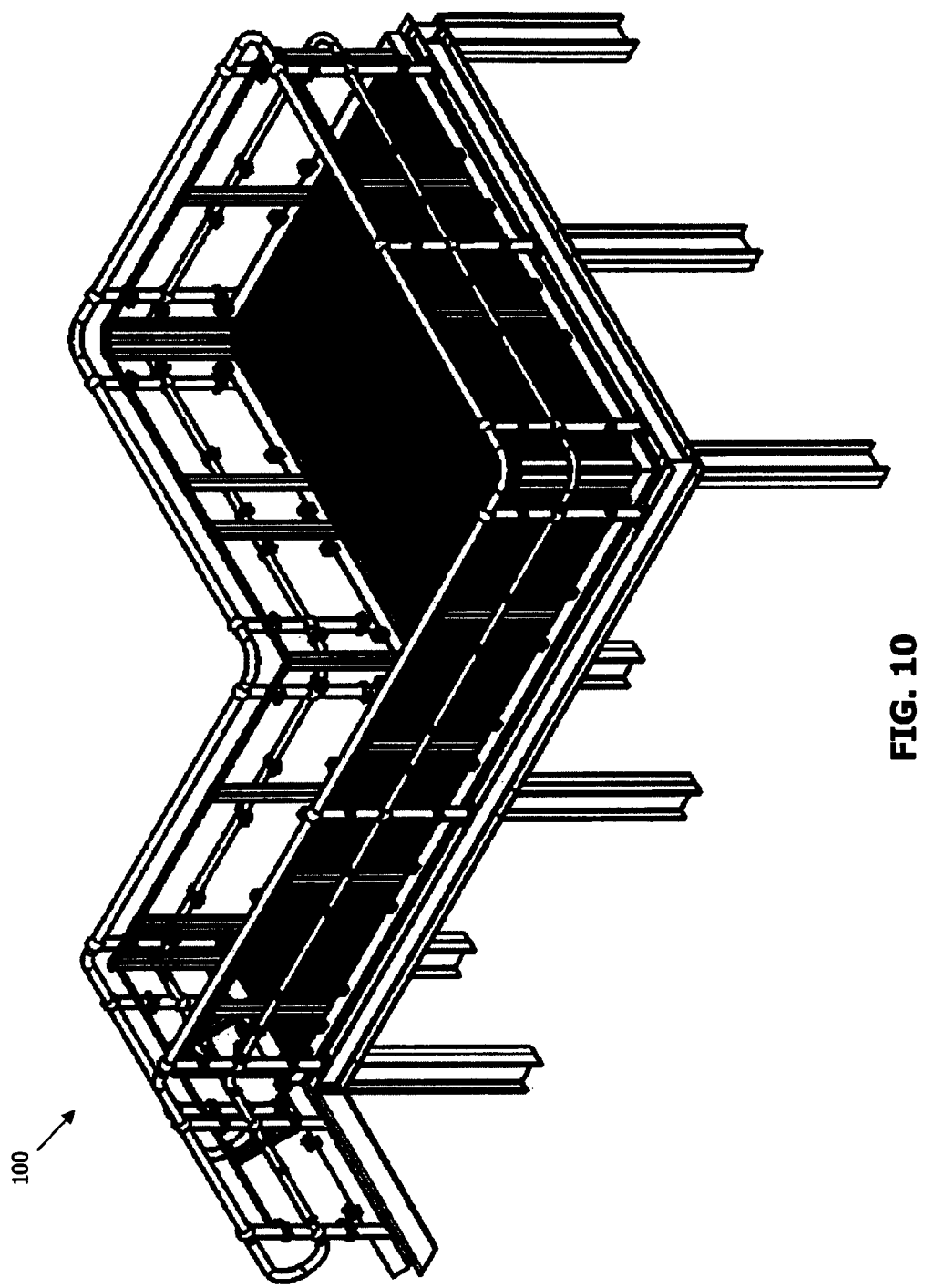
FIG. 10 illustrates a perspective view of the safety barricading system installed upon a handrail of an elevated platform and stairway.

Referring to FIGS. 8 and 9, the tubular clip 105 includes a notch 105H that is located at the base of the two arms 105A, and more importantly, is located between the two arms 105A. The notch 105H enables a removal tool 125 to be inserted therein, to pry loose the tubular clip 105 form the tubular surface 131.

With respect to the above description, it is to be realized that the optimum dimensional relationship for the various components of the barricade system 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

The barricade system 100 includes at least one mesh panel 101 that is secured against an existing surface, object, or structure via a plurality of the clips 102. The safety barricade system 100 is designed to adaptively attach onto a building or structure in a temporary or permanent basis, and prevent objects from falling there from. The safety barricade system 100 includes tools that remove the clips 102 after use as well as joiner assemblies that abut adjacent sections of mesh panels 101 at varying angles. The clips 102 each include an eccentric pin joiner and mesh clip button that attach to one another as well as onto the respective clip 102, and sandwich the mesh panel there between so as to secure the mesh panel 101 to the respective clip 102.

The operation of the barricade system 100 will now be described. When a mesh panel 101 is to be mounted on a construction site or other location, a plurality of tubular clips 105 or kick rail clips 104 are initially located as required and fastened to kick rails or tubes as described above.

The eccentric pin joiner 106 is placed against the tubular clips 105 and kick rail clips 104, and the eccentric pin joiner 106 is snapped into engagement such that the first projection 106A positively engages with one of the holes 104C, 105G. The mesh panel 101 is then placed against the eccentric pin joiners 106. If the apertures on the mesh panel 101 do not line up with the second projections 106B, one or more of the eccentric pin joiners 106 may be manually rotated. On account of the eccentric nature of the eccentric pin joiner 106, by rotating the eccentric pin joiner 106 about the first projection 106A, the location of the second projection 106B translates around an arc. When a suitable position is reached such that the second projection 106B lines up with openings in the matrix of the mesh screen 101, the mesh screen 101 is pushed into place, and the clip button 107 is snapped into engagement with the second projections 106B. The length and width of the apertures in the mesh panel 101 is smaller than the diameter of the clip button 107, so the mesh panel 101 is unable to be unintentionally removed.

In the embodiment depicted in the drawings, the clip button 107 connects to the first projection 106A on account of the flared barb like head or flanges 106C, as described above. However, it will be appreciated that the first projection 106A and clip button 107 may be connected with a set screw, grub screw or other fastener.

Advantageously, the barricade system 100 includes a plurality of joiner assemblies that enable abutting sections of mesh panels to be secured to one another at a plurality of angles.

The barricade system 100 provides a removal tool that aids in removing the clips 102 from a tubular surface.

Advantageously, the barricade system can be used on platforms, stairways, stair risers, scaffolding, machine guarding as well as barricading and many more applications.

Advantageously, the barricade system is fast and easy to install, minimising disruptions onsite. There is no onsite design or fabrication required.

Advantageously, the barricade system is non heat conductive, anti-static, anti-corrosive, fire resistant, impact resistant, chemical resistant, UV Stabilised, non-conductive, light weight (approx 2.6 Kg per metre attached).

Advantageously the barricade system is reusable, and suits permanent or temporary installations.

Advantageously the safety barricade provides eccentric pin joiners and mesh clip buttons that sandwich a small portion of the mesh panel and also secure the mesh panel to the respective uniquely defined clip.

Although the invention has been described with reference to specific examples, it will be appreciated by those skilled in the art that the invention may be embodied in many other forms.

The invention claimed is:

1. A mounting clip for a barricade and/or machine guarding system, the mounting clip comprising:
   at least one clip having a first engagement formation adapted to secure the clip to a fixed structure, the clip further having a second engagement formation;
   a joiner element having a third engagement formation located on a first side, and a fourth engagement formation located on an opposing second side, the third engagement formation being adapted to engage the second engagement formation to secure the joiner element to the clip, wherein the third engagement formation includes a projection extending perpendicularly with respect to the joiner element, and wherein the fourth engagement formation includes a second projection generally parallel and offset relative to the first projection; and
   a stopper element having a fifth engagement formation, the fifth engagement formation being engageable with the fourth engagement formation to secure the stopper element to the joiner element,
   wherein the second engagement formation is pivotally engaged with the third engagement formation, and the third engagement formation is eccentric relative to the fourth engagement formation.

2. The mounting clip of claim 1, wherein the second engagement formation includes a first aperture, and the third engagement formation includes a first projection having a flange adapted to engage with the first aperture.

3. The mounting clip of claim 2, wherein the fourth engagement formation includes a second projection, having a flange adapted to engage with a stopper element aperture formed in the stopper element.

4. The mounting clip of claim 3, wherein the first projection and the second projection are generally parallel and offset relative to each other.

5. The mounting clip of claim 1, wherein the first engagement formation includes one or more channels including angled teeth;
   wherein the angled teeth are directed toward a base region of the channel, and presented at an angle such that upon insertion of an object therein, the angled teeth inhibit removal of said object from the channel.

6. The mounting clip of claim 1, wherein the second engagement formation includes a plurality of first apertures permitting the first projection to be mounted in multiple locations.

7. The mounting clip as described in claim 1, wherein the first engagement formation includes a tubular clip having two arms that extend away from one another.

8. The mounting clip as described in claim 7, wherein the two arms define a generally cylindrical opening adapted to receive a cylindrical object.

9. The mounting clip as described in claim 8, wherein the tubular clip comprises a clevis shaped body.

10. The mounting clip as described in claim 7, wherein both of the arms include a pin hole that enables the insertion of a pin to enclose the cylindrical opening.

11. The mounting clip as described in claim 7, wherein the clip includes a notch that is located in between the two arms;
    wherein the notch enables the insertion of a removal tool between the clip and the cylindrical object.

12. The mounting clip as described in claim 1, wherein the stopper element is a generally circular body and the fifth engagement formation is located in a central region of the body.

13. A barricade and/or machine guarding system comprising:
    at least one mounting clip according claim 1;
    at least one mesh panel;
    wherein in use, a portion of the mesh panel is located between the stopper element and the joiner element.

14. The barricade and/or machine guarding system as described in claim 13, further comprising a joiner assembly to secure adjacent sections of said mesh panel to one another.

15. The barricade and/or machine guarding system as described in claim 14, wherein the joiner assembly includes a body having a first longitudinally extending joiner channel and a second longitudinally extending joiner channel, the first and second longitudinally extending joiner channels each being adapted to receive an edge portion of said mesh panel.

16. The barricade and/or machine guarding system of claim 15, further including angled teeth located in the first and second longitudinally extending joiner channels;
    wherein the angled teeth are directed toward a base of the first and second longitudinally extending joiner channels, and presented at an angle such that upon insertion of a mesh panel therein, the angled teeth inhibit removal of said mesh panel.

17. The barricade and/or machine guarding system of claim 16, wherein the joiner channels are coplanar to interconnect coplanar edges of adjacent mesh panels.

18. The barricade and/or machine guarding system of claim 16, wherein the joiner channels are angularly inclined relative to each other.

19. The barricade and/or machine guarding system of claim 13, wherein the joiner element has a generally oval shaped body.

20. A method of installing a barricade system and/or a machine guard to a fixed structure, the method including the steps of:
- engaging a first engagement formation formed on a clip to the fixed structure;
- engaging a second engagement formation formed on the clip to a third engagement formation formed on a joiner element, the second engagement formation being pivotally engaged with the third engagement formation, wherein a first projection defining a third engagement formation extends perpendicularly from a first side of the joiner element, and a second projection defining a fourth engagement formation extends perpendicularly from an opposed second side of the joiner element, and the second projection is generally parallel and offset relative to the first projection;
- placing a mesh panel adjacent to the joiner element;
- rotating a body portion of the joiner element so that a fourth engagement formation formed on an opposing side of the joiner element relative to the third engagement formation becomes aligned with an aperture formed in the mesh panel, the third engagement formation being eccentric relative to the fourth engagement formation; and
- securing a fifth engagement formation located on a stopper element to the fourth engagement formation to sandwich a portion of the mesh panel between the joiner element and the stopper element.

\* \* \* \* \*